(12) United States Patent
Hohlbein

(10) Patent No.: US 8,857,003 B2
(45) Date of Patent: Oct. 14, 2014

(54) CONTOURING TOOTHBRUSH HEAD

(75) Inventor: Douglas J. Hohlbein, Pennington, NJ (US)

(73) Assignee: Colgate-Palmolive Company, New York, NY (US)

(*) Notice: Subject to any disclaimer, the term of this patent is extended or adjusted under 35 U.S.C. 154(b) by 494 days.

(21) Appl. No.: 12/193,379

(22) Filed: Aug. 18, 2008

(65) Prior Publication Data

US 2008/0307596 A1 Dec. 18, 2008

Related U.S. Application Data

(63) Continuation of application No. 11/341,225, filed on Jan. 26, 2006, now abandoned, which is a continuation (Continued)

(51) Int. Cl.
| | | |
|---|---|---|
| A46B 9/04 | (2006.01) | |
| A46B 15/00 | (2006.01) | |
| A46B 9/02 | (2006.01) | |
| A46B 5/00 | (2006.01) | |
| A46B 7/06 | (2006.01) | |
| B29L 31/42 | (2006.01) | |

(52) U.S. Cl.
CPC ....... *A46B 15/0002* (2013.01); *B29L 2031/425* (2013.01); *A46B 2200/1066* (2013.01); *A46B 15/0032* (2013.01); *A46B 9/04* (2013.01); *A46B 9/028* (2013.01); *A46B 5/002* (2013.01); *A46B 9/045* (2013.01); *A46B 7/06* (2013.01); *A46B 9/026* (2013.01); *A46B 5/0025* (2013.01)
USPC .......................................... 15/167.1; 15/110

(58) Field of Classification Search
CPC ................. A46B 9/04; A46B 15/0075; A46B 2200/066; A46B 2200/1026; A46B 3/22

USPC ......................................... 15/167.1, 110, 172
See application file for complete search history.

(56) References Cited

U.S. PATENT DOCUMENTS

| | | | |
|---|---|---|---|
| 279,424 A | 6/1883 | Packer | |
| 301,644 A | 7/1884 | Thompson | |

(Continued)

FOREIGN PATENT DOCUMENTS

| | | |
|---|---|---|
| CA | 2004029 | 5/1990 |
| CH | 460705 | 10/1968 |

(Continued)

OTHER PUBLICATIONS

"Poly-Pro Propylene" "The Intregral Hinge", Spencer Chemical Co. (1963).

(Continued)

*Primary Examiner* — Laura C Guidotti
(74) *Attorney, Agent, or Firm* — Thibault Fayette

(57) ABSTRACT

The present invention discloses a toothbrush having a handle and an articulated head coupled to the handle. The articulated head includes two sections and each of the head sections has a bottom surface and a side surface. Each of the head sections includes a plurality of bristles extending from the bottom surface of that head section and at least one of the head sections includes a plurality of elastomeric fingers partially defining the side surface of that head section and partially extending from the bottom surface of the head section. The head section most remote from the handle, in a normal configuration of the articulated head, is angled with respect to the other head section.

11 Claims, 14 Drawing Sheets

Related U.S. Application Data of application No. 10/109,637, filed on Apr. 1, 2002, now Pat. No. 6,996,870, which is a continuation-in-part of application No. 29/148,074, filed on Sep. 14, 2001, now Pat. No. Des. 456,139, said application No. 11/341,225 is a continuation-in-part of application No. 09/897,606, filed on Jul. 3, 2001, now Pat. No. 6,442,787, which is a continuation of application No. 09/422,953, filed on Oct. 22, 1999, now Pat. No. 6,314,606, which is a continuation of application No. 09/351,178, filed on Jul. 12, 1999, now Pat. No. 6,073,299, which is a continuation of application No. 09/090,331, filed on May 29, 1998, now Pat. No. 5,991,958, which is a continuation of application No. 08/762,783, filed on Dec. 10, 1996, now Pat. No. 5,758,383.

(60) Provisional application No. 60/008,734, filed on Dec. 29, 1995.

(56) References Cited

U.S. PATENT DOCUMENTS

| | | | |
|---|---|---|---|
| 301,664 A | 7/1884 | Boykin | |
| 758,764 A | 5/1904 | MacLeod | |
| 759,490 A | 5/1904 | Yates | |
| 803,995 A | 11/1905 | Davenport | |
| 846,900 A * | 3/1907 | Bloom | 15/176.4 |
| 914,501 A | 3/1909 | McEachern | |
| 958,371 A | 5/1910 | Danek | |
| 1,007,328 A | 10/1911 | Brandstetter | |
| 1,022,920 A | 4/1912 | Anderson | |
| 1,125,532 A * | 1/1915 | Himmel | 15/117 |
| 1,251,250 A | 12/1917 | Libby | |
| 1,327,757 A | 1/1920 | Eggers | |
| 1,327,807 A | 1/1920 | Burleigh | |
| 1,369,966 A | 3/1921 | Peden | |
| 1,466,723 A | 9/1923 | Izawa | |
| 1,639,880 A | 8/1927 | Butler | |
| 1,860,924 A | 5/1932 | Cooke | |
| 1,924,152 A | 8/1933 | Coney et al. | |
| 1,927,365 A | 9/1933 | Frolio | |
| 1,928,328 A | 9/1933 | Carpentier | |
| 1,976,271 A | 10/1934 | Vachoux | |
| 2,003,243 A | 5/1935 | Campbell et al. | |
| 2,028,011 A | 1/1936 | Raymond | |
| 2,042,239 A | 5/1936 | Planding | |
| 2,043,898 A | 6/1936 | Malcolm | |
| 2,088,839 A | 8/1937 | Francisco et al. | |
| 2,097,987 A | 11/1937 | Phillips | |
| 2,117,174 A | 5/1938 | Jones | |
| 2,129,082 A | 9/1938 | Byrer | |
| 2,139,245 A | 12/1938 | Ogden | |
| 2,209,173 A | 7/1940 | Russell | |
| 2,225,331 A | 12/1940 | Campbell | |
| 2,254,365 A | 9/1941 | Griffith et al. | |
| 2,266,195 A | 12/1941 | Hallock | |
| 2,326,632 A | 8/1943 | Friedman | |
| 2,438,268 A | 3/1948 | Bressler | |
| 2,443,297 A | 6/1948 | Bressler | |
| 2,685,703 A | 4/1949 | Dellenbach | |
| 2,631,320 A | 3/1953 | Bressler | |
| 2,650,383 A | 9/1953 | Bressler | |
| 2,676,350 A | 4/1954 | Bressler | |
| 2,702,914 A | 3/1955 | Kittle et al. | |
| 2,796,620 A | 6/1957 | Bressler | |
| 2,797,424 A | 7/1957 | Olson | |
| 3,103,027 A | 9/1963 | Birch | |
| 3,152,349 A | 10/1964 | Brennescholtz | |
| 3,174,174 A | 3/1965 | Dengler | |
| 3,188,672 A | 6/1965 | Gary | |
| 3,230,562 A | 1/1966 | Birch | |
| 3,253,292 A | 5/1966 | Herschensohn | |
| 3,320,225 A | 5/1967 | Bradbury | |
| 3,398,421 A | 8/1968 | Rashbaum | |
| 3,408,112 A | 10/1968 | Piotrowski | |
| 3,553,759 A | 1/1971 | Kramer et al. | |
| 3,643,282 A | 2/1972 | Lechene et al. | |
| 3,722,020 A | 3/1973 | Hills | |
| D226,942 S | 5/1973 | Okuda | |
| 3,739,419 A | 6/1973 | Natman et al. | |
| 3,900,550 A | 8/1975 | Oliver et al. | |
| D255,511 S | 6/1980 | Hill et al. | |
| 4,274,174 A | 6/1981 | Ertel | |
| 4,277,862 A | 7/1981 | Weideman | |
| 4,288,883 A | 9/1981 | Dolinsky | |
| 4,339,482 A | 7/1982 | Glaser et al. | |
| 4,369,284 A | 1/1983 | Chen | |
| 4,488,328 A | 12/1984 | Hyman | |
| 4,520,526 A | 6/1985 | Peters | |
| 4,535,014 A | 8/1985 | Wright | |
| 4,563,381 A | 1/1986 | Woodland | |
| 4,566,145 A | 1/1986 | Wachtel | |
| 4,618,213 A | 10/1986 | Chen | |
| 4,654,922 A | 4/1987 | Chen | |
| 4,691,405 A | 9/1987 | Reed | |
| 4,712,266 A | 12/1987 | Yamaki | |
| 4,712,267 A | 12/1987 | Cheng | |
| 4,757,570 A | 7/1988 | Haeusser et al. | |
| 4,768,837 A | 9/1988 | Boucherie | |
| 4,800,608 A | 1/1989 | Key | |
| 4,829,621 A | 5/1989 | Phenegar | |
| D301,644 S | 6/1989 | Sestak | |
| 5,001,803 A | 3/1991 | Discko, Jr. | |
| 5,040,260 A | 8/1991 | Michaels | |
| 5,052,071 A | 10/1991 | Halm | |
| 5,054,154 A | 10/1991 | Schiffer et al. | |
| 5,114,214 A | 5/1992 | Barman | |
| D335,579 S | 5/1993 | Chuang | |
| 5,262,468 A | 11/1993 | Chen | |
| 5,269,038 A | 12/1993 | Bradley | |
| 5,323,504 A | 6/1994 | McCusker | |
| 5,336,708 A | 8/1994 | Chen | |
| 5,339,482 A | 8/1994 | Desimone et al. | |
| 5,351,358 A | 10/1994 | Larrimore | |
| 5,371,915 A | 12/1994 | Key | |
| 5,373,602 A | 12/1994 | Bang | |
| 5,393,796 A | 2/1995 | Halberstadt et al. | |
| 5,398,366 A | 3/1995 | Bradley | |
| 5,398,369 A | 3/1995 | Heinzelman et al. | |
| 5,438,726 A | 8/1995 | Leite | |
| 5,465,450 A | 11/1995 | Humphries | |
| 5,483,722 A | 1/1996 | Scheier et al. | |
| 5,502,930 A | 4/1996 | Burkette et al. | |
| 5,508,334 A | 4/1996 | Chen | |
| 5,511,277 A | 4/1996 | Simonds | |
| 5,533,791 A | 7/1996 | Boucherie | |
| 5,618,882 A | 4/1997 | Hammond et al. | |
| 5,628,082 A | 5/1997 | Moskovich | |
| 5,630,244 A | 5/1997 | Chang | |
| 5,633,286 A | 5/1997 | Chen et al. | |
| 5,651,158 A | 7/1997 | Halm | |
| 5,673,452 A | 10/1997 | Chang et al. | |
| 5,742,972 A | 4/1998 | Bredall et al. | |
| 5,743,972 A | 4/1998 | Bredall | |
| 5,758,383 A | 6/1998 | Hohlbein | |
| 5,761,759 A | 6/1998 | Leversby et al. | |
| 5,774,923 A | 7/1998 | Halm | |
| 5,813,079 A | 9/1998 | Halm | |
| 5,836,033 A | 11/1998 | Berge | |
| 5,930,860 A | 8/1999 | Shipp | |
| 5,946,758 A | 9/1999 | Hohlbein et al. | |
| 5,946,759 A | 9/1999 | Cann | |
| 5,970,564 A * | 10/1999 | Inns et al. | 15/201 |
| 5,991,958 A | 11/1999 | Hohlbein | |
| 6,065,176 A | 5/2000 | Watanabe et al. | |
| 6,066,282 A | 5/2000 | Kramer | |
| 6,073,299 A | 6/2000 | Hohlbein | |
| 6,151,745 A | 11/2000 | Roberts et al. | |
| 6,311,358 B1 | 11/2001 | Soetewey et al. | |
| 6,314,606 B1 | 11/2001 | Hohlbein | |
| 6,374,448 B2 * | 4/2002 | Seifert | 15/110 |
| 6,442,787 B2 | 9/2002 | Hohlbein | |

(56) References Cited

U.S. PATENT DOCUMENTS

| | | | |
|---|---|---|---|
| 6,463,618 B1 * | 10/2002 | Zimmer | 15/110 |
| 6,599,048 B2 | 7/2003 | Kuo | |
| 6,996,870 B2 | 2/2006 | Hohlbein | |
| 2001/0013151 A1 | 8/2001 | Gelder et al. | |

FOREIGN PATENT DOCUMENTS

| | | |
|---|---|---|
| CN | 2167603 | 6/1994 |
| DE | 1233821 | 2/1967 |
| DE | 1657299 | 2/1971 |
| DE | 2410175 | 9/1975 |
| DE | 3628722 | 2/1988 |
| DE | 3840136 | 5/1990 |
| DE | 4339829 | 4/1994 |
| DE | 9402125 | 7/1994 |
| DE | 201 07 614 U1 | 9/2002 |
| DE | 101 22 987 A1 | 11/2002 |
| DE | 20 2005 009 026 U1 | 10/2005 |
| EP | 0 360 766 | 3/1990 |
| EP | 371293 | 6/1990 |
| EP | 454625 | 10/1991 |
| EP | 336641 | 5/1992 |
| EP | 648448 | 4/1995 |
| FR | 442832 | 9/1912 |
| FR | 567187 | 2/1924 |
| FR | 707727 | 7/1931 |
| FR | 777340 | 2/1935 |
| FR | 1100290 | 9/1955 |
| FR | 1247433 | 10/1960 |
| FR | 2652245 | 3/1991 |
| GB | 189335 | 11/1922 |
| GB | 304459 | 1/1929 |
| GB | 412414 | 6/1934 |
| GB | 647924 | 12/1950 |
| JP | 59-2224 | 1/1984 |
| JP | 60-29527 | 2/1985 |
| JP | 66-2303 | 7/1985 |
| JP | 2000157338 A | 6/2000 |
| RU | 2107448 | 3/1998 |
| SU | 1687243 | 10/1991 |
| TW | 63699 | 12/1984 |
| WO | WO 92/17092 | 10/1992 |
| WO | WO 92/17093 | 10/1992 |
| WO | WO 94/05183 | 3/1994 |
| WO | WO 94/09678 | 5/1994 |
| WO | WO 96/02165 | 2/1996 |
| WO | WO 96/15696 | 5/1996 |
| WO | WO 97/07707 | 3/1997 |
| WO | WO 97/25900 | 7/1997 |
| WO | WO 98/07349 | 2/1998 |
| WO | WO 98/18364 | 5/1998 |
| WO | WO 99/37181 | 7/1999 |
| WO | WO 99/37182 | 7/1999 |
| WO | WO 00/49911 | 8/2000 |
| WO | WO 00/64307 | 11/2000 |
| WO | WO 00/76369 | 12/2000 |
| WO | WO 03/030680 | 4/2003 |

OTHER PUBLICATIONS

"Guide for Injection Molding Pro-fax Polymophylene" (1987).
"Construeren in Kunststoffen Deel B", T. Delft (1986).
Definition "Different", Webster's New World Dictionary, Third Edition, 1988.
Copy of the definition of angle, with examples of angles, from Webster's New World Dictionary, Third College Edition, 1988.

* cited by examiner

CONTOURING TOOTHBRUSH HEAD

CROSS-REFERENCE TO RELATED APPLICATIONS

This application is a Continuation that claims the benefit of U.S. patent application Ser. No. 11/341,225 which is a Continuation application of U.S. patent application Ser. No. 10/341,637 (filed Apr. 1, 2002) (now U.S. Pat. No. 6,996,870), which is Continuation-in-part that claims the benefit of U.S. patent application Ser. No. 29/148,074 (filed Sep. 14, 2001) (now U.S. Pat. No. D456,139S) and U.S. patent application Ser. No. 9/897,606 (filed Jul. 3, 2001), which is a Continuation Application of U.S. patent application Ser. No. 09/422,953 (filed Oct. 22, 1999) (now U.S. Pat. No. 6,314,606), which is a Continuation Application of U.S. patent application Ser. No. 09/351,178 (filed Jul. 12, 1999) (now U.S. Pat. No. 6,073,299), which is a Continuation Application of U.S. application Ser. No. 09/090,331 (filed May 29, 1998) (now U.S. Pat. No. 5,991,958), which is a Continuation Application of U.S. patent application Ser. No. 08/762,783 (filed Dec. 10, 1996) (now U.S. Pat. No. 5,758,393), which claims priority under 35 U.S.C. § 119(e) of Provisional Patent Application Ser. No. 60/008,734 (filed Dec. 29, 1995) (now abandoned), which applications are incorporated herein in their entireties.

FIELD OF THE INVENTION

This invention relates to a toothbrush and more particularly to a toothbrush head construction wherein the head is designed and configured to yield a brushing surface conforming to curved sections of teeth and which is bendable to conform to straight teeth sections.

BACKGROUND OF THE INVENTION

Prior toothbrush constructions include toothbrush heads having pivoted or articulated sections joined together in a variety of constructions, such as a resilient strip of metal or the likes and also include pivoted or hinged articulated sections to provide a curved bristle configuration.

A curved/angled bristle surface configuration offers improved access to hard-to-reach areas such as the lingual surfaces of the front teeth and behind the rear molars, placing more bristles in contact with the outer surfaces of the front teeth.

Many current brushes which have rigidly mounted bristles and a rigid curved/angled bristle surface exhibit an inherent disadvantage when brushing both flat as well as concave tooth surfaces. Placing a curved/angled bristle surface on flat tooth surfaces results in fewer bristles making contact with the teeth. These fewer bristles must support the brushing forces applied through the handle, which will result in premature splaying of the bristles. Some current toothbrushes have a "power tip" configuration (elongated rigidly mounted tip bristles) which are claimed to have improved access benefits.

SUMMARY OF THE INVENTION

According to the invention, an articulated toothbrush head is defined by two head sections joined by one or more thin bridges of the same resin from which the toothbrush is formed, as by molding, to produce an integral construction. These thin bridges permit limited flexing between the two head sections, the two sections normally being at a small angle with respect to each other. That portion of the head between the two head sections may be in one embodiment, in the general form of a T shaped slot running transversely of the top surface of the head, from one side head side edge to another. The slot is filled, as by injection, with an elastomer to control and enhance flexing. The construction is such that the head section most remote from the handle is normally tilted with respect to the head section nearest the handle, the latter head section located at one end of the handle. In a second embodiment, the head section may assume the form of a narrow cylindrical portion, or in a third embodiment two thin bridges may be employed, both having elastomer.

An advantage of the present flexible configuration is, in addition to the above noted features of a curved configuration, its inherent gentleness on the gums. When one brushes along the gumline with a power tip configuration, one focuses much of the force through the concentrated area at the raised tip. With the present configuration, this force is more evenly distributed.

There are considerable manufacturing efficiencies with having the elastomer material of this invention used in the flex area being the same elastic material as that which may be used as a grip material in the handle area. Therefore, a configuration which allows flexing under the loads typically encountered during brushing with materials which are suitable for use as a grip would be desirable.

To achieve the flexibility described above, the cross section of elastomer may be convoluted, with one or more convolutes. To aid in fixing the elastomer to the toothbrush head sections, the elastomer may be configured to fit into one or more slots at both ends of the flexing area.

To minimize the gap between bristle tufts when the head is flexed into a flat configuration, it is desirable to position the plastic (resin) bridge between the tip and handle portions as near the bristle tips as possible. This bridge is straightened during flexing, and directly controls the gap between bristle tufts on each side of the flex area.

The present invention also provides a toothbrush including a handle and an articulated head coupled to the handle, the head including, two sections. Each of the head sections has a bottom surface and a side surface and each of the head sections includes a plurality of bristles extending from the bottom surface of that head section. In one embodiment, at least one of the head sections includes a plurality of elastomeric fingers partially defining the side surface of that head section and partially extending from the bottom surface of that head section. The head section most remote from the handle, in a normal configuration of the head, may be angled with respect to the other head section. The elastomeric fingers are adapted, for example, to provide a massaging action against the gums when the toothbrush is applied along the gumline and the elastomeric fingers are contacted with the gums.

DETAILED DESCRIPTION OF THE INVENTION

Figure 1:
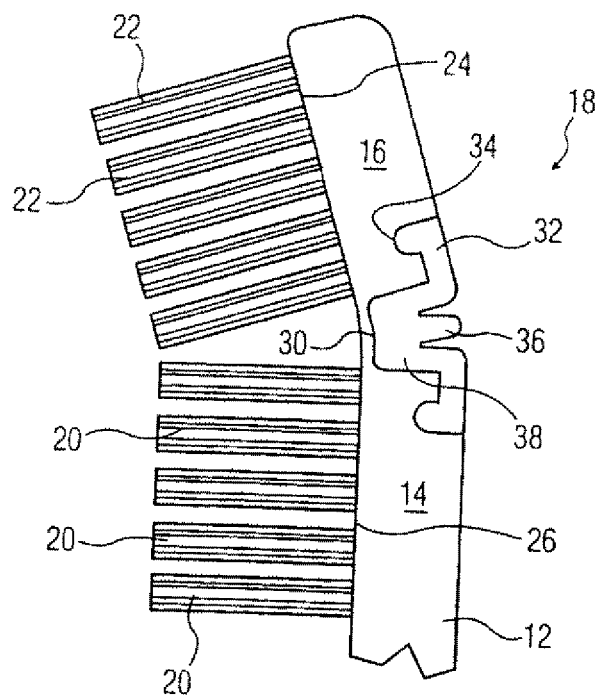
FIG. 1 is a side elevational view illustrating the toothbrush head of this invention according to a first embodiment.

Referring now to FIG. 1, a side elevational view of a toothbrush embodying the features and construction of this invention is shown in a vertical position, with a portion of the handle designated as 12. While not completely shown the reader will understand that the handle extends downwardly and has a longitudinal axis. That portion of the head nearest the handle is designated as section 14 and is collinear with the handle, while that portion of the head most remote from the handle is designated as section 16. An elastomer section or joint between facing ends of sections 14 and 16 is denoted generally as 18. A plurality of tufts of bristles 20 extends at right angles to section 14, while a similar plurality of tufts of bristles 22 extends at right angles from section 16. Tufts of bristles 22 are thus at right angles to lower surface 24 of head section 16, while tufts of bristles 20 are perpendicular to lower or bottom surface 26 of head section 14.

Figure 2:
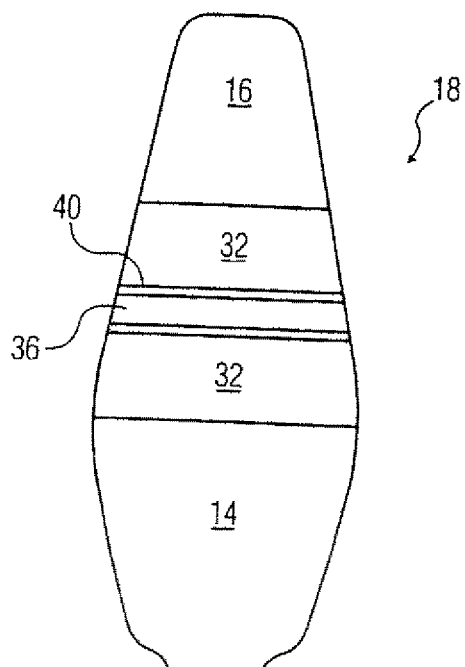
FIG. 2 is a top plan view of the toothbrush head shown at FIG. 1.

A generally T-shaped groove, in longitudinal cross section, extends transversely across the upper or top surface of the head and is thus located between sections 14 and 16. The bottom of the central or main part of the groove is spaced from the lower surface of the composite head, leaving a thickness or bridge section designated as 30 which joins the lower portions of the two head sections. Bridge or zone 30 is typically of a thickness between 20 and 40 thousandths of an inch. The handle and head sections are molded from a plastic or resin such as polypropylene. The generally T shaped groove is filled with a resilient and soft thermoplastic elastomer. The T groove has two symmetrical wing portions 32, each terminating in an enlarged portion 34, the latter extending towards respective groups of tufts of bristles. The middle of the T shaped resin insert section 18 includes an integral ridge 36, while the lower portion or base portion of the T section is designated as 38. The thermoplastic elastomer which forms section 18 may be a thermoplastic VULCANATE (TPV) consisting of a mixture of polypropylene and EPDM (ethylene propylene diene monomers) which is available as SANTOPRENE (brand), described in U.S. Pat. No. 5,393,796 issued to Halberstadt et al, or VYRAM (brand), another TPV consisting of a mixture of polypropylene and natural rubber, both SANTOPRENE and VYRAM (brands) being elastomers marketed by Advanced Elastomer Systems. Other suitable elastomers include KRATON, a brand of styrene block copolymer (SBC) marketed by Shell, and DYNAFLEX G 6725 (brand), a thermoplastic elastomer marketed by GLS Corporation and which is made with KRATON (brand) polymer. These and other suitable elastomers have, typically, a Shore A hardness of from about 13 to 94, with 23 to 28 being a preferred hardness. Grooves 40, on the top surface of the composite head, extend on both sides of raised rib or ridge 36, and border sections FI. FIG. 2 further illustrates the construction. It is seen that elastomer section 18 spans the width of the head sections.

In the normal configuration of the head, it is seen that head section 16 is tilted with respect to head section 14 at an angle, typically about 18.degree. Thus, a force exerted on the brush during brushing is required to tilt section 16 if it is to be more nearly or completely aligned with section 14. The two head sections may be molded in their angled configuration as shown at FIG. 1, with the elastomer then added. Alternatively, the two head sections may be molded aligned with each other and then angled upon locating or injecting the elastomer between them.

Figure 3:
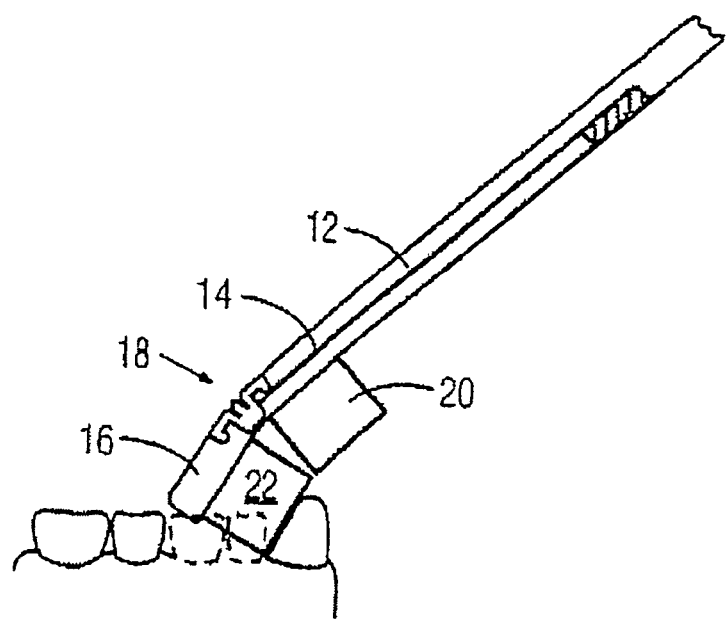
FIG. 3 is an elevational view showing the head and tufts of bristles as brushing the inside surfaces of the lower teeth,.

Referring now to FIG. 3, it is seen that the effective curvature of the two head sections 14 and 16 offers improved access to inner and rear surfaces of the teeth. Thus, handle 12 need not be inclined as much as otherwise in order for forward section 16 and its bristles 22 to engage interior surfaces of the lower front teeth. In brushing a straight section of teeth, the deformability of the elastomer section 18 permits section 16 to partially or completely align itself with handle 12 and section 14.

Figure 4:
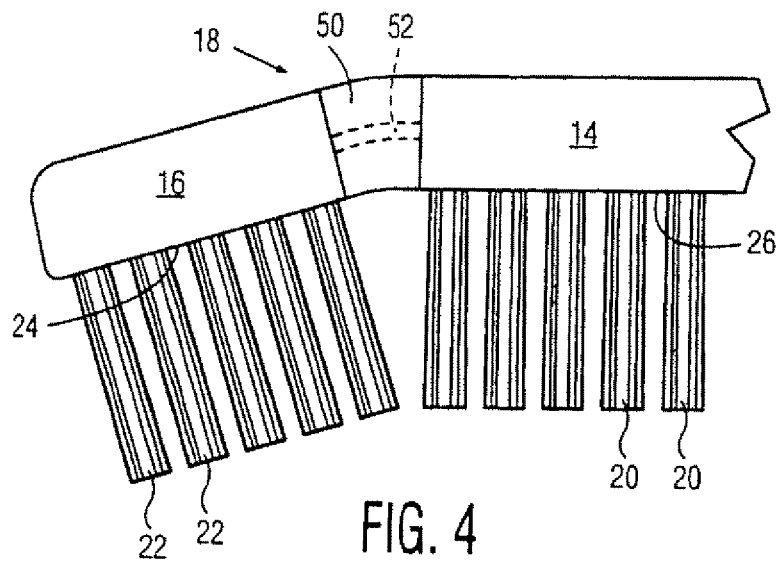
FIG. 4 is a view similar to FIG. 1 and slows an second embodiment.

FIG. 4 illustrates a second embodiment of the invention, there shown as horizontally disposed, and similar to that of FIGS. 1 and 2 except for a different construction for angularly joining the two head sections. The elastomer joint is again denoted as 18, with the elastomer itself denoted as 50 and being of the same composition as previously set out, and extends across the width of the head, and is located between the facing ends of sections 14 and 16. A thin integral bridge connection centrally between the two sections is designated as 52, typically being of cylindrical form in transverse cross section. Each end is integral with a respective head section. The elastomer is seen as completely surrounding bridge 52. This bridge connection may be, in transverse cross section, of any desired form. A top plan view of the head would be similar to FIG. 2, except for the absence of grooves 40 and rib 36. As seen at FIG. 4, the extent of the elastomer along the toothbrush longitudinal axis is shorter than that of FIGS. 1 and 2. Integral connection or bridge 52 performs the same function as bridge 30 of FIG. 1, namely, integrally joining the two head sections.

Figure 5:
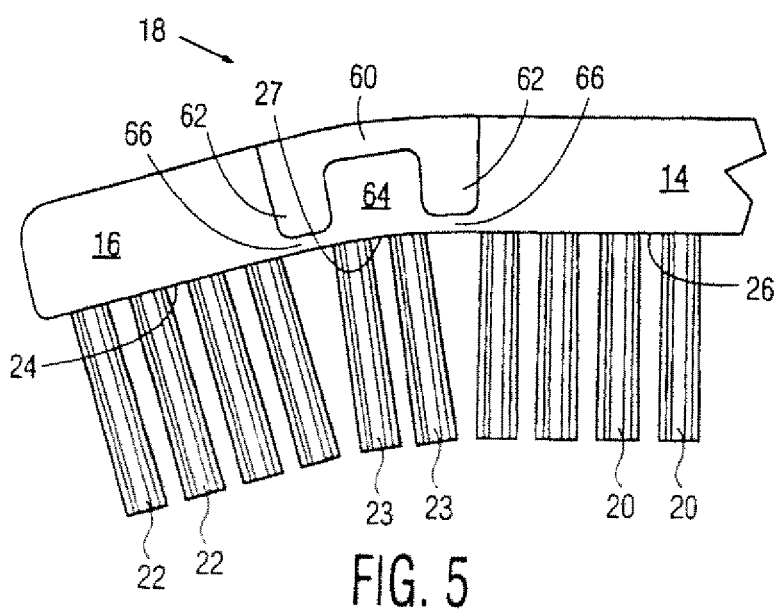
FIG. 5 is a view similar to FIG. 1 and shows a third embodiment.

FIG. 5 shows a third embodiment, again shown as horizontal. There, the lower surfaces 24 and 26 of bristled head sections 14 and 16 are joined by an intermediate arcuate bottom surface 27 having tufts of bristles 23 extending orthogonally and downwardly therefrom. An elastomer section 18 is generally C shaped and has a bight part 60 and tips or ends 62, the latter located in respective complementary double troughs or double grooves which extend transversely across the head. The elastomer tips are separated by head portion 64, with thin bridges 66, again formed from the molded resin forming the toothbrush, joining the two head sections at the lower surface of the whole head. The C shaped elastomer thus surrounds portion 64 across the width of the head.

The second and third embodiments yield the same cleaning action as shown at FIG. 3. The thickness of bridges 52 and 66 is the same as that of bridge 30 of FIG. 1.

It is seen that the bridges 30, 52 and 66 of the respective embodiments inhibit longitudinal separation of the two head sections by resisting tensile or other forces which might result in such separation, while the elastomer also controls the degree of flexing when head section 16 is subject to brushing forces. The function of the bridges is thus to tether the two head sections together, as well as to set them at an initial angle. When the sections move toward straightening or alignment, each elastomer section is deformed. Such deformation is resisted by the elastomer and to a lesser extent by the resin (polypropylene) bridges so that the sections revert to their normal, angled relationship upon the cessation of brushing force on forwardmost section 16.

Figure 6:
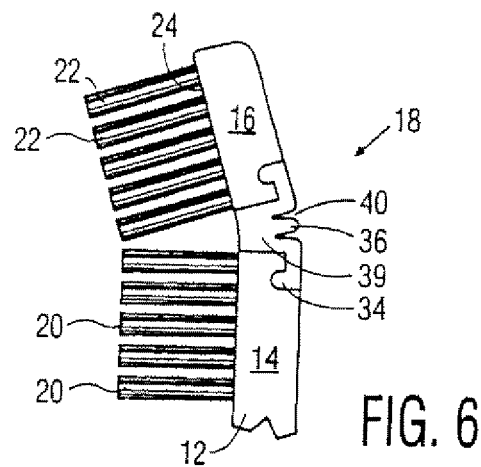
FIG. 6 is a side elevational view of a fourth embodiment.

FIG. 6 illustrates a fourth embodiment which differs from that shown in FIG. 1 only in the absence of bridge 30, of FIG. 1. Instead of bridge 30, the two head sections are coupled by T shaped elastomer section 39, the latter being of the same form as that of section 38 of FIG. 1, except that it extends all the way to the lower surface of the head.

Figure 7:
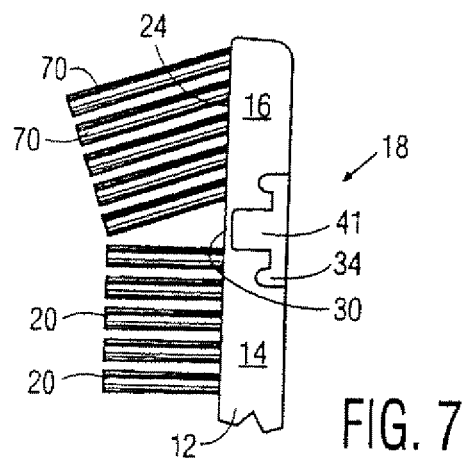
FIG. 7 is a side elevational view of a fifth embodiment.

FIG. 7 shows a fifth embodiment, here the two bead sections 14 and 16 being normally aligned. A generally T shaped elastomeric section 41 forms a joint 18 which fills the spaces between the ends of the two head sections 14 and 16, except for bridge 30, identical with bridge 30 of FIG. 1, which integrally tethers the two head sections together. Tufts of bristles 70 are slanted with respect to lower head surface 24 of head section 16, the slanting being towards handle 12. Tufts 70 are of successively different lengths, with the longest being near the most remote free end or tip of the head section 16. It is seen that the tips, of bristle tufts 70 and 20 form a generally concave brushing surface which is at times, during brushing, flattened upon bending of joint IS.

Figure 8:
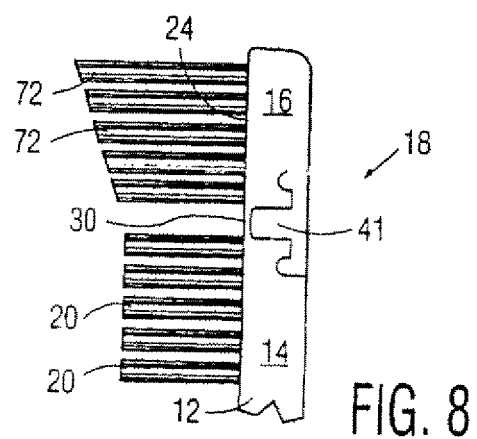
FIG. 8 is a side elevational view of a sixth embodiment.

FIG. 8 illustrates a sixth embodiment, similar to that of FIG. 7, and differs therefrom only in that the head section 16 tufts here denoted as 72, extend orthogonally from surface 24. These latter tufts are, as tufts 70, of uniformly different lengths. The longest are near the free end of head section 16.

Again, the free ends of tufts 72 and 20 form a generally concave brushing surface which is at times, during brushing, flattened upon bending of joint 18.

Many toothbrushes available in the marketplace today are "dual component," by which is meant that an elastomeric material is used to a greater or lesser extent, particularly in the finger gripping portion of the brush. The method of manufacture of such dual component brushes by injection molding is thus exceedingly well known in the art today. The toothbrushes according to the present invention may be made by use of such conventional dual component technology. For example, in accordance with a first method of manufacturing brushes according to the present invention, the elastomeric material may be introduced into the head area from the handgrip area via a molded-in channel (assuming a handgrip area is required). Alternatively, the elastomer could be introduced into the head area via a second injection point or gate located at the head, thereby eliminating the need for a molded-in channel. The head may then be tufted using conventional staple technology.

Figure 9:
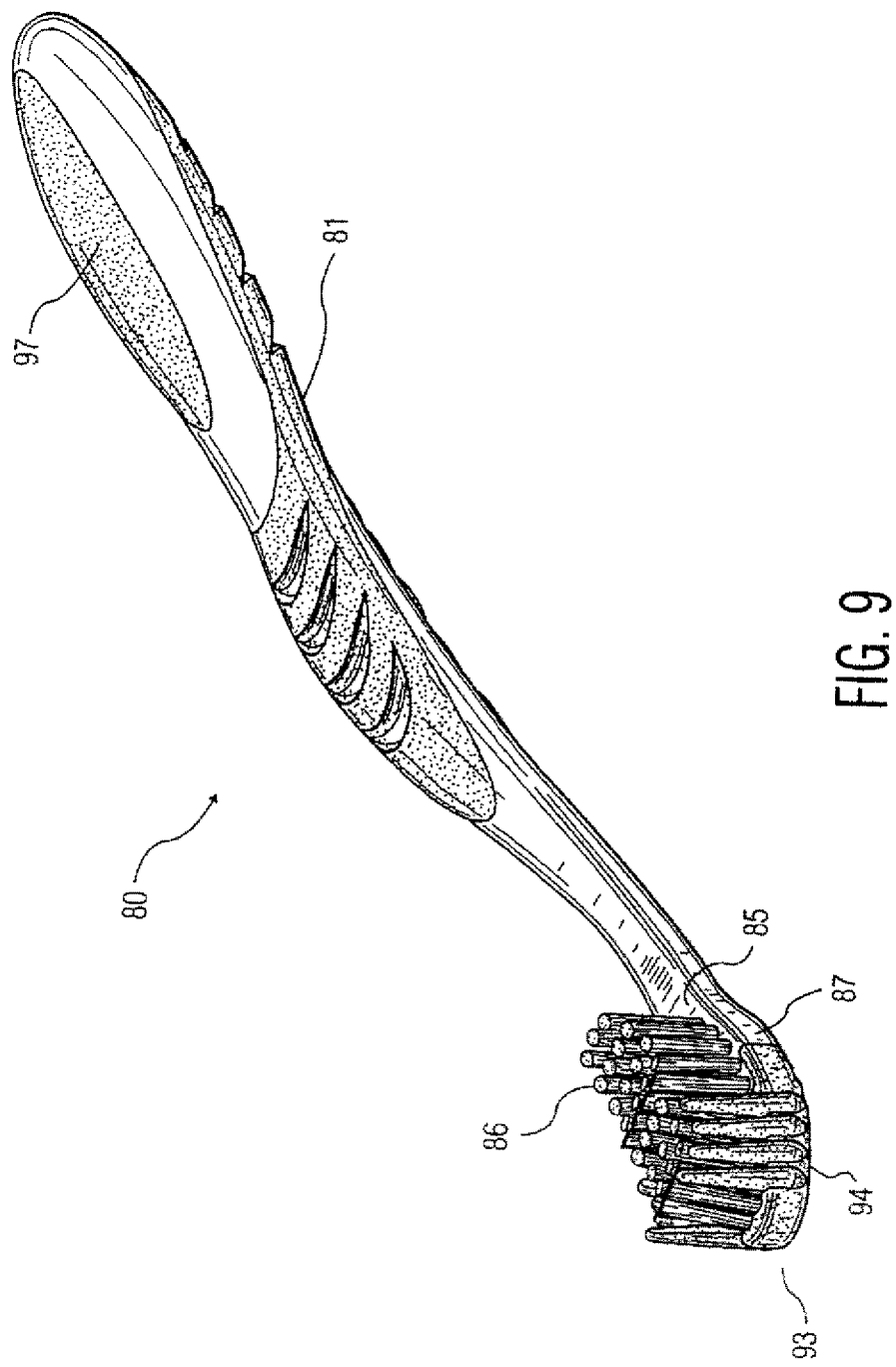
FIG. 9 is a perspective view of a toothbrush in a normal configuration according to an embodiment of the present invention.
Figure 10:
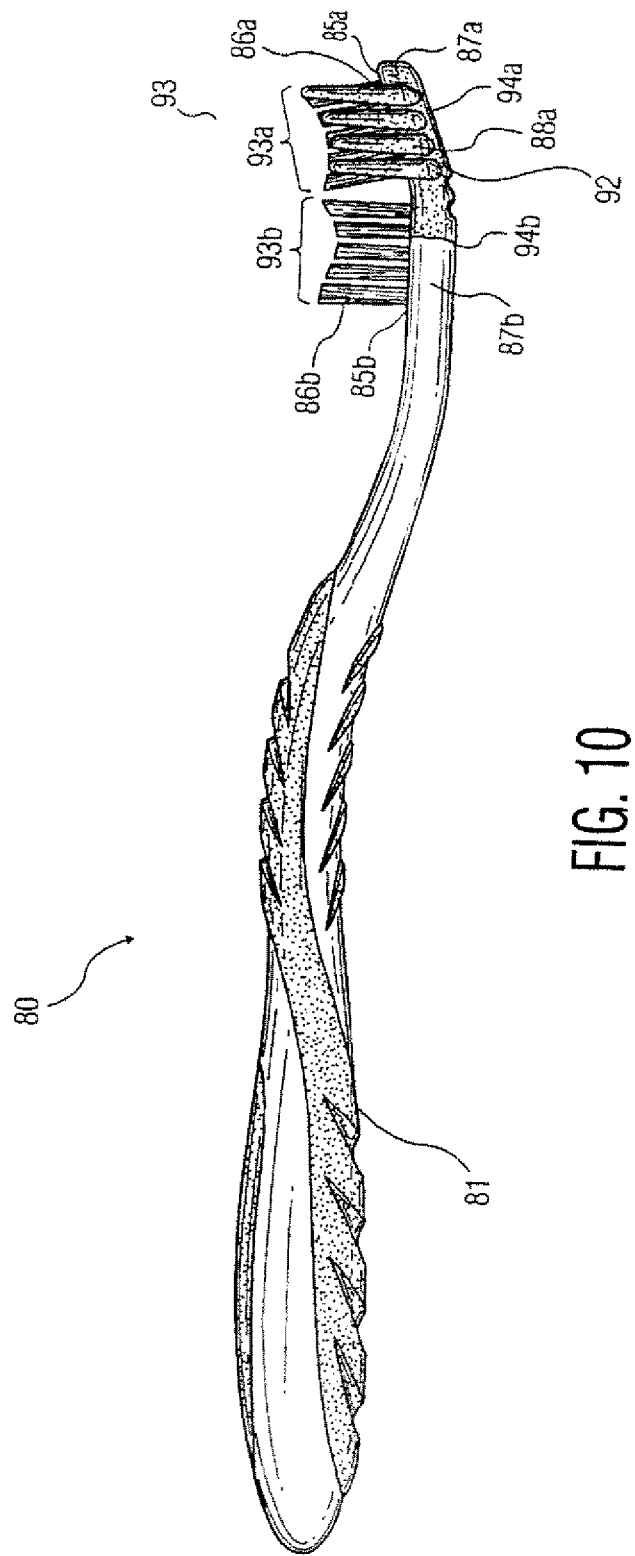
FIG. 10 is a side view of a toothbrush in a normal configuration according to an embodiment of the present invention.
Figure 11:
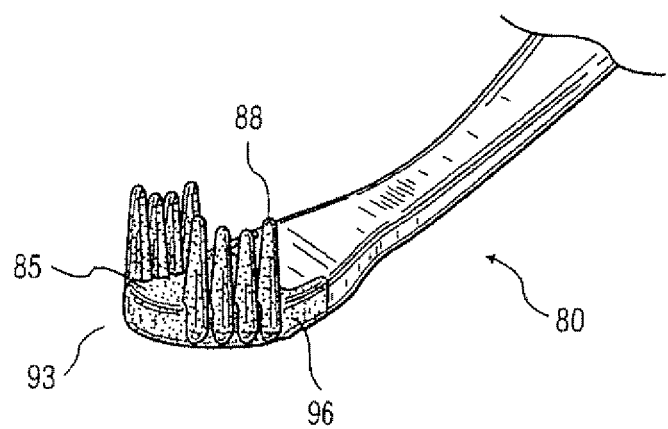
FIG. 11 is a perspective view of a toothbrush bead in a normal configuration according to an embodiment of the present invention.

In another embodiment as illustrated in FIG. 9, the present invention provides a toothbrush 80 having a handle SI and an articulated head 93 coupled to handle 81. Head 93 includes a bottom surface 85, a first side surface 87, a second side surface 96 (not shown), and a top surface 94. A plurality of bristles 86 extends from the bottom surface 85. As illustrated in FIG. 10, head 93 may include two sections 93 and 93. Head section 93a includes a bottom surface 85a, a first side surface 87a, a second side surface 96a (not shown), and a top surface 94a. Head section 93b includes a bottom surface 85b, a first side surface 87b, a second side surface 96b (not shown), and a top surface 94b. Each of the head sections 93a/93b has a respective plurality of bristles 86a/86b extending from the respective bottom surface 85a/85b thereof. In particular head section 93a has a plurality of bristles 86a extending from bottom surface 85a and head section 93b has a plurality of bristles 86b extending from bottom surface 85b. As seen in FIG. 11, at least one of the head sections has a plurality of elastomeric fingers 88 partially defining the first and/or second side surface of the head section and partially extending from the bottom surface of the first and/or second side surface. The plurality of elastomeric fingers 88 is adapted to provide, for example, massaging action to the gums when toothbrush 80 is applied along the gumline and the elastomeric fingers 88 are contacted with the gum.

As seen in FIGS. 9-20, the plurality of elastomeric fingers 88 may extend in a direction generally orthogonal to the bottom surface. As seen in FIGS. 9-20, the plurality of elastomeric fingers 88 may also extend in a direction substantially parallel to either the plurality of bristles 86a or the plurality of bristles 86b. In one embodiment, there is about a 15° angle between each of the fingers of the plurality of elastomeric fingers 88 and each of the bristles of the plurality of bristles 86.

Figure 12:
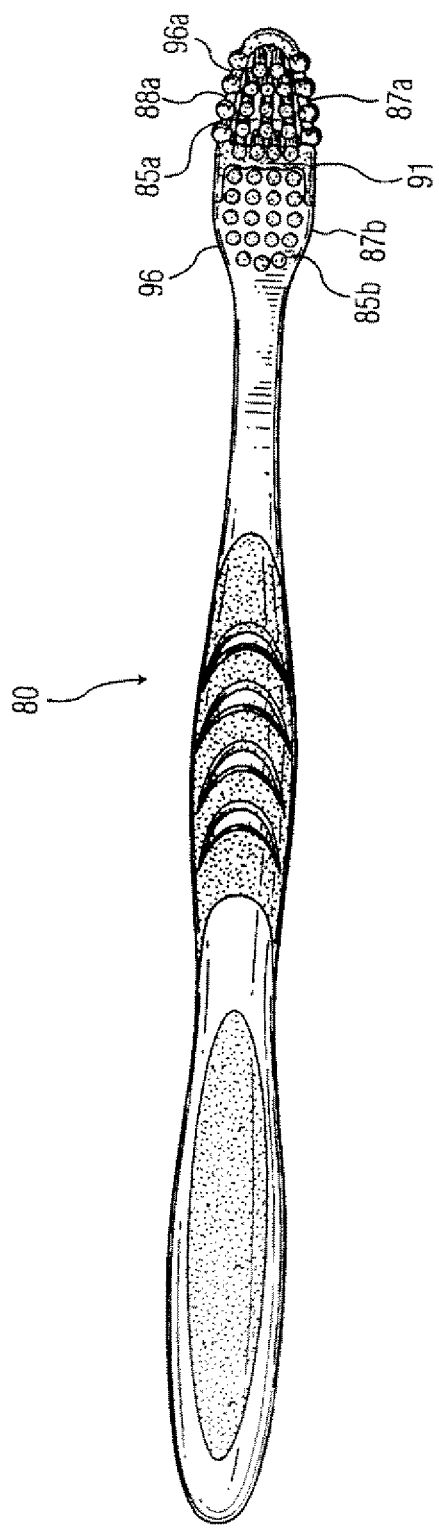
FIG. 12 is a view of the bottom surface of a toothbrush in a normal configuration according to an embodiment of the present invention.
Figure 13:
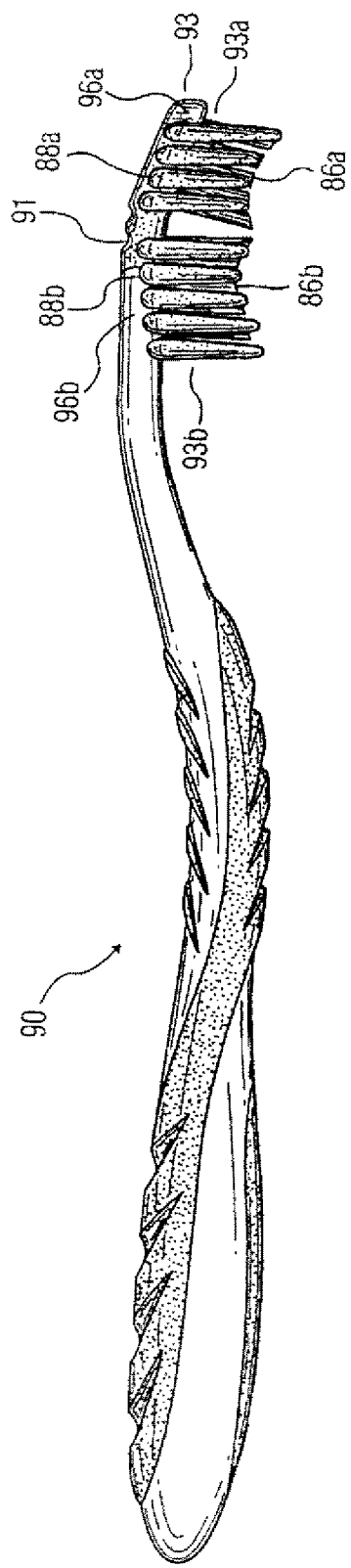
FIG. 13 is a side view of a toothbrush in a normal configuration according to an embodiment of the present invention.

The plurality of elastomeric fingers 88 may partially define a first and/or second side surface of one head sections or both head sections. FIG. 11 depicts a plurality of elastomeric fingers 88a partially defining first side surface 87a of head section 93a. FIG. 12 depicts a plurality of elastomeric fingers 88a partially defining second side surface 96a of head section 93a in addition to first side surface 87a. FIG. 13 depicts a plurality of elastomeric fingers 88 partially defining second side surface 96a of head section 93a and second side surface 96b of head section 93b. FIG. 11 depicts a plurality of elastomeric fingers 88 partially defining first side surface 87 (not shown) and second side surface 96 of head 93 (elastomeric fingers as partially define both side surfaces of both head sections). It will be understood that the present invention contemplates any combination of arrangement of the plurality of elastomeric fingers 88. By partially defining the side surface of head section 93, the plurality of elastomeric fingers does not sacrifice the amount of surface area of the plurality of bristles 86.

The plurality of elastomeric fingers 88 may partially define a first and/or second side surface of one head section or both head sections. FIG. 10 depicts a plurality of elastomeric fingers 88a partially defining first side surface 87a of head section 93a. FIG. 12 depicts a plurality of elastomeric fingers 88a partially defining second side surface 96a of head section 93a in addition to first side surface 87a. FIG. 13 depicts a plurality of elastomeric fingers 88 partially defining second side surface 96a of head section 93a and second side surface 96b of head section 93b. FIG. 11 depicts a plurality of elastomeric fingers 88 partially defining first side surface 87 (not shown) and second side surface 96 of head 93 (elastomeric fingers 88 partially define both side surfaces of both head sections). It will be understood that the present invention contemplates any combination of arrangement of the plurality of elastomeric fingers 88. By partially defining the side surface of head section 93, the plurality of elastomeric fingers does not sacrifice the amount or surface area of the plurality of bristles 86.

Figure 14:
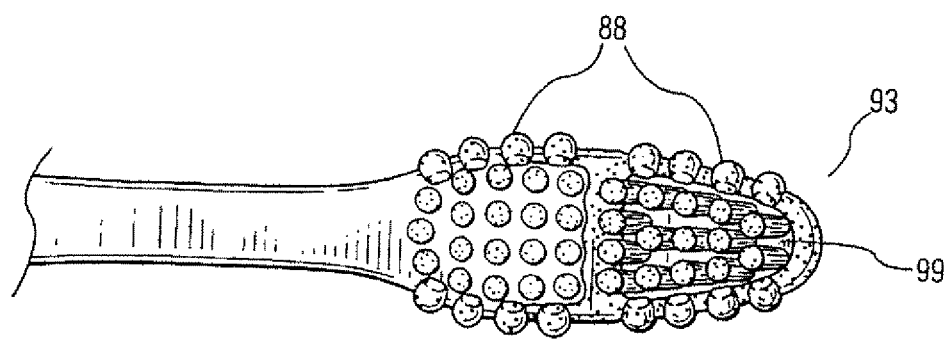
FIG. 14 is a view of the bottom surface of a toothbrush in a normal configuration according to an embodiment of the present invention.
Figure 15:
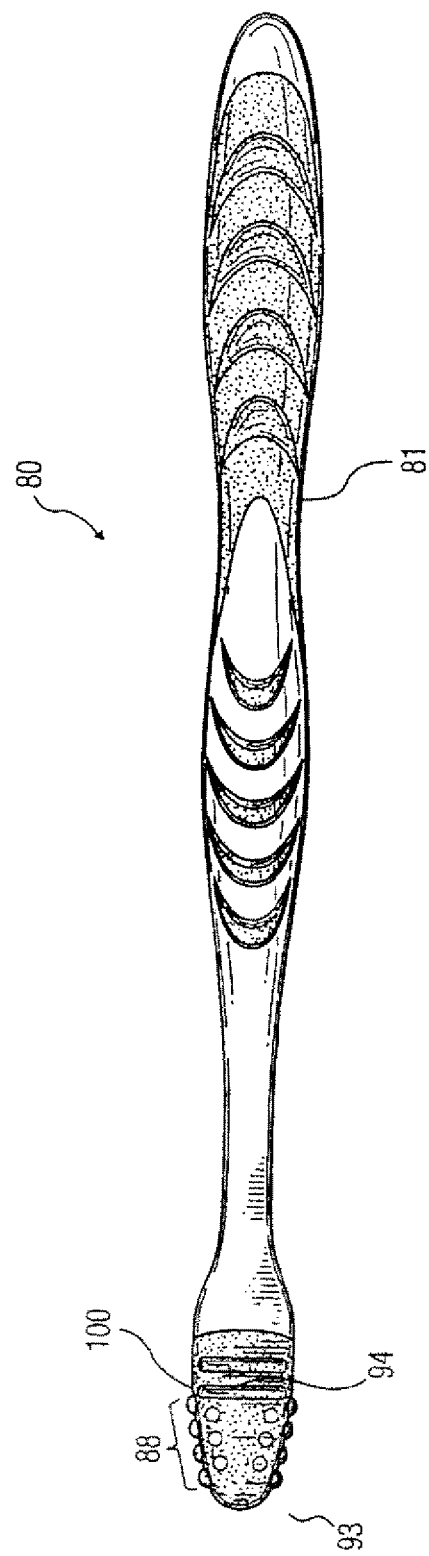
FIG. 15 is a view of the top surface of a toothbrush according to an embodiment of the present invention.

As shown in FIG. 14, head 93 may have a primary brushing area 99, and the plurality of elastomeric fingers 88 may be outside or outboard the primary brushing area 99 of head 93. Top surface 94 of head 93 may be defined by a periphery 100, and elastomeric fingers 88 may extend outside of periphery 100 of top surface 94 as illustrated in FIG. 15. In an embodiment, positioning the elastomeric fingers 88 outside of the primary brushing area 99 may allow the elastomeric fingers 88 to better hit the gumline of a user. In addition, the elastomeric fingers 88 may not use any, or as much of the tooth-cleaning bristle area. In addition, positioning the elastomeric fingers 88 outside of the primary brushing area 99 may facilitate the stapling, trimming and end rounding manufacturing process, especially where the tips of the elastomeric fingers 88 are the same height as the tufts of bristle behind each finger. As depicted in FIG. 10 and FIG. 13, head section 93a, in a normal configuration of head 93, may be angled with respect to head section 93b. The angled configuration of head section 93a may allow toothbrush 80 greater access to hard-to-reach areas, such as the lingual surfaces of the front teeth and behind the rear molars, and place more bristle in contact with the outer surface of the front teeth.

Figure 16:
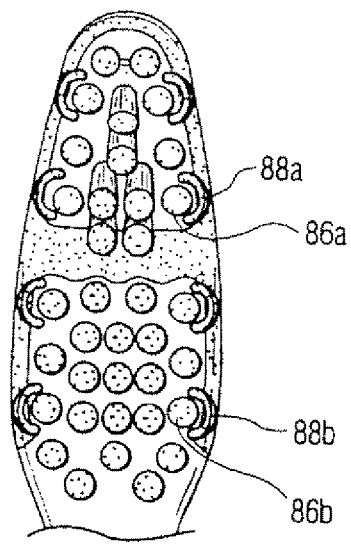
FIG. 16 is a view of the bottom surface of a toothbrush head according to an embodiment of the present invention.
Figure 17:
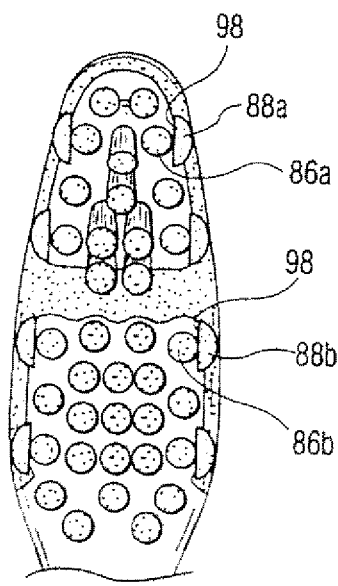
FIG. 17 is a view of the bottom surface a toothbrush head according to an embodiment of the present invention.

With respect to the dimensions of the elastomeric fingers 88, the plurality of elastomeric fingers may be of uniform length, of uniformly different lengths, or of non-uniformly different lengths. In a preferred embodiment, as illustrated in FIGS. 10 and 13, the lengths of the elastomeric fingers 88 approximately follow the curved contour formed by the free ends of the plurality of bristles 86. In particular the elastomeric fingers 88a follow the curved contour formed by the free ends of the plurality of bristles 86a and the elastomeric fingers 88b follow the curved contour formed by the free ends of the plurality of bristles 86b. The elastomeric fingers 88 may be configured in any shape. For example, as illustrated in FIG. 16, each of the plurality of elastomeric fingers 88a/88b is C-shaped. Due to this C-shape, a finger 88 may partially encircle a tuft of bristles 86a/86b and may aid in a flossing ability of the tuft of bristles by enabling the tuft of bristles 86a/86b to remain substantially rigid or preventing the bristles from substantially flexing. This flossing ability refers to the ability of bristles 86a/86b to access areas between teeth. The C-shape of each of the elastomeric fingers 88a/88b is only one example of a configuration that may facilitate the flossing ability of the bristles 86a/86b. If such a function is desired, the elastomeric fingers 88a/88b may be configured in any shape suitable to promote the flossing ability of the bristles 86a/86b. In an alternative embodiment, as illustrated in FIG. 17, each of the plurality of elastomeric fingers 88a/88b is D-shaped. In such a configuration, a side surface 98 of the plurality of elastomeric fingers 88a/88b facing the plurality of bristles 86a/86b is substantially flat, to provide extra clearance between the bristles and the elastomeric fingers.

Each of the plurality of elastomeric fingers 88 may be discrete as illustrated in FIGS. 9-16, or the bottom ends of the plurality of elastomeric fingers 88 may be attached or connected to other elastomeric fingers 88 in some manner. By "bottom end," what is meant is the portion of the elastomeric fingers 88 closest to top surface 94. If each of the plurality of elastomeric fingers is discrete, the bottom ends of the elastomeric fingers 88 may be at varying distances from top surface 94. The top end of the plurality of elastomeric fingers 88 may be substantially rounded or flat. By "top end," what is meant is the portion of the elastomeric fingers 88 farthest from top surface 94. The top end may be configured in any shape and may be suitable for the function of providing a massaging action to the gums when toothbrush 90 is applied along the gumline and the elastomeric fingers 88 are contacted with the gums.

The plurality of elastomeric fingers 88 may be composed of an elastomeric material, such as, for example, TPV and other elastomeric materials previously mentioned and discussed. Preferably, the shore hardness value of the elastomeric material is less than 30. More preferably, the shore hardness value of the elastomeric material is between about 23 and 28.

Figure 18:
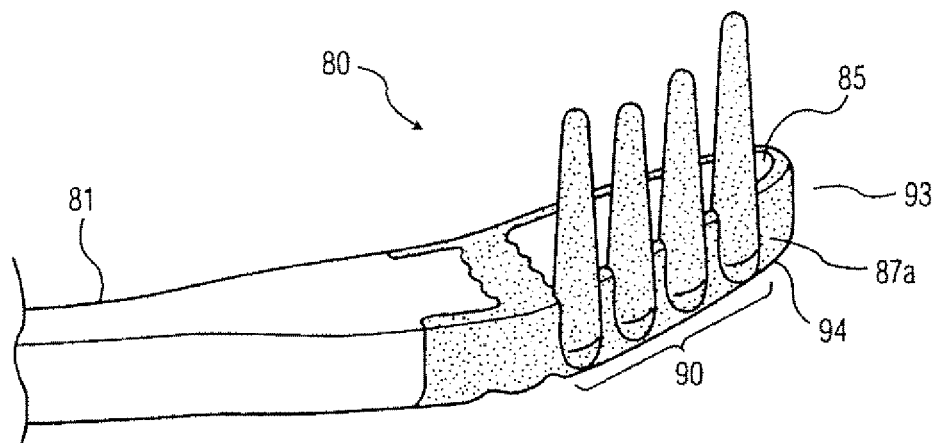
FIG. 18 is a perspective view of a toothbrush head in a normal according to an embodiment of the present invention.
Figure 19:
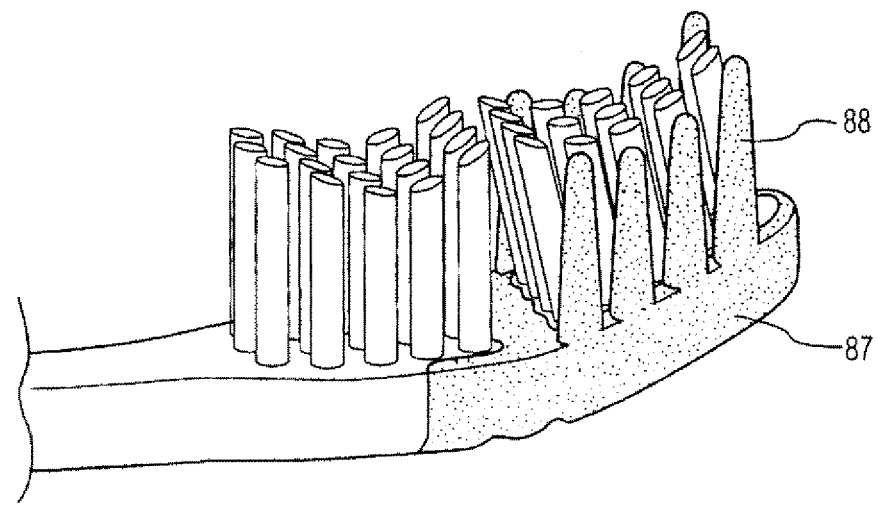
FIG. 19 is a side view of a toothbrush head in a normal configuration according to an embodiment of the present invention.

In an embodiment of present invention as illustrated in FIG. 18, toothbrush 80 includes a handle 81 (partially shown) and an articulated head 93 coupled to the handle 81. Head 93 includes a bottom surface 85, a first side surface 87, a second side surface 96 (not shown), and a top surface 94. Although not specifically illustrated in FIG. 15, head 93 may include two sections 93a and 93b. Each of the head sections 93a/93b may have a plurality of bristles 86 (not shown) extending from the respective bottom surface thereof. At least one of the head sections has a plurality of elastomeric fingers 88 partially defining ridges 90 of a respective side surface thereof. The ridges 90 form a convoluted side surface adapted to provide, for example, a massaging action to gingival or oral tissue such as the inner cheeks and tongue when toothbrush 80 is applied to teeth and ridges 90 are contacted with the oral tissue. In one embodiment head section 93a, in a normal configuration of head 93, is angled with respect to head section 93b. In another embodiment as illustrated in FIG. 19, the plurality of elastomeric fingers 88 defines a smooth side surface 87.

In an embodiment as illustrated in FIG. 12 and FIG. 13, toothbrush 80 includes a flex area 91, which may include an elastomeric material. In an embodiment as illustrated in FIG. 13, wherein head section 93a is angled with respect to head section 93b, the deformability of flex area 91 permits head section 93a to partially or completely align itself with handle 81 and head section 93b. In another embodiment as depicted in FIG. 10, head section 93a includes an elastomeric area 92, which for example includes first side surface 87a, second side surface 96a (lot shown) and top surface 94a. Handle 81 may also include an elastomeric section 97, as illustrated in FIG. 9. The elastomeric fingers 88, the flex area 91, the elastomeric area 92 of head section 93a, and the elastomeric section 97 of handle 81 may be composed of the same elastomer or different elastomers. In an embodiment, the elastomeric fingers 88 extend from the elastomeric area 92 of head section 93a. This embodiment may provide improved fit and control of the brush head when used to brush teeth. In an embodiment, the elastomeric fingers 88 may generate more motion, and may generate more movement along the gum line, when the head is straightened.

With respect to bristles 86, in one embodiment, at least of some of the bristles 86a/86b extending from bottom surface 85a/85b of head section 93a/93b are of uniformly different lengths as illustrated in FIGS. 10 and 13. As seen from these Figures, the tips of bristles 86a/86b may form a generally concave brushing surface, which is at times during brushing, flattened upon bending of the head. In an alternative embodiment, at least some free ends of the plurality of bristles 86 extending from one of the head sections forms a slant with respect to the bottom surface of the head section. For example, as seen in FIG. 10, at least some of the free ends of the plurality of bristles 86a extending from bottom surface 8ea of head section 93a forms a slant with respect to bottom surface 85a of head section 93a.

In an embodiment as illustrated in FIG. 13, the geometry of toothbrush 80 is such that if toothbrush 80 is in a resting position on a flat surface and bottom surface 85 of head 93 is facing the flat surface, the plurality of elastomeric fingers 88 do not contact the flat surface. By "resting position," what is meant is a position such that no external pressure is applied to the plurality of elastomeric fingers 88 other than the pressure applied by the flat surface. According to one manufacturing method of toothbrush 80, after toothbrush 80 has been molded via an injection molding machine, the molded toothbrush 80 (without bristles) drops from the molding machine onto a flat surface of a cooling conveyor. Handle 81 then rolls either onto a table or in a bin. The plurality of bristles 86 is then stapled into head 93. According to this embodiment, the geometry of toothbrush 80 is such that handle 81 may lay in any position without resulting in the elastomeric fingers 88 being bent by the pressure exerted on the elastomeric fingers 88 by the flat surface of the conveyor.

Figure 20:
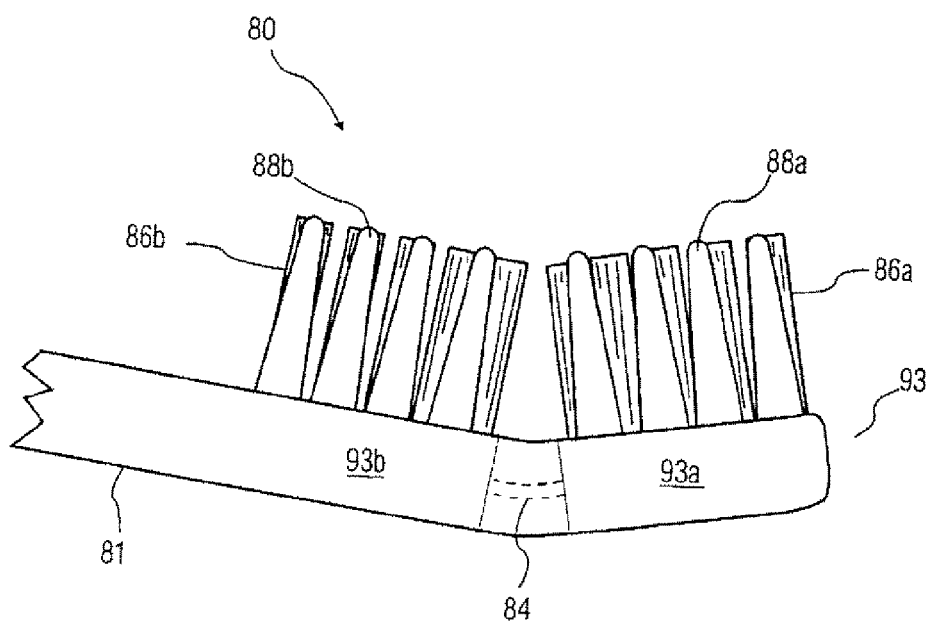
FIG. 20 is a side view of a toothbrush in a normal configuration according to an embodiment of the present invention.

In yet another embodiment of the present invention as illustrated in FIG. 20, toothbrush 80 includes a handle 81 (partially shown) and an articulated head 93 joined to handle 81. The articulated head 93 may include a first section 93a and a second section 93b. At least part of the handle 81, the first section 93a and the second section 93b is integrally molded of the same material. The first section 93a includes a first plurality of bristles 86a and the second section 93b includes a second plurality of bristles 86b. The first plurality of bristles 86a extends generally orthogonally from first section 93a and the second plurality of bristles 86b extends generally orthogonally from second section 93b. At least one of the first section 93a and the second section 93b includes a plurality of elastomeric fingers 88a/88b defining a respective side surface thereof. The first section 93a and the second section 93b are the only sections of the articulated head 93 that include bristles. First section 93b is the only one of the sections joined to handle 81. Second section 93a is joined to first section 93b by at least one bridge 84. Second section 93a, in a normal configuration of articulated head 93, is angled with respect to first section 93b.

The invention claimed is:

1. A toothbrush comprising
a handle;
a head having a longitudinal axis, a proximal end adjacent the handle, a bottom surface, a top surface opposite the bottom surface, and a peripheral surface extending between the bottom surface and the top surface, the peripheral surface comprising a first side surface, a second side surface opposite the first side surface, and a distal side surface extending between the first side surface and the second side surface:
the head comprising a plastic and an integral mass of elastomeric material, the integral mass of elastomeric material forming at least a portion of the top surface of the head, at least a portion of the bottom surface of the head, at least a portion of the first side surface of the head, at least a portion of the second side surface of the head, and at least a portion of the distal side surface of the head;
the integral mass of elastomeric material comprising a plurality of elastomeric fingers extending from the bottom surface of the head, each of the elastomeric fingers terminating in a closed and rounded top end;
a plurality of bristle tufts extending from the bottom surface of the head, wherein at least some of the plurality of bristle tufts are slanted in a direction towards the proximal end of the head with respect to a location on the bottom surface of the head from which the at least some of the plurality of bristle tufts extend;
wherein the slanted bristle tufts include a first slanted bristle tuft having a first length and a second slanted bristle tuft having a second length, the first length being greater than the second length, and the first slanted bristle tuft being positioned on the head closer to the distal side surface of the head than the second slanted bristle tuft;
wherein the plurality of elastomeric fingers are positioned on the head in an adjacent manner, adjacent elastomeric fingers being spaced apart by a gap, wherein no bristle tufts are positioned within the gap between adjacent elastomeric fingers; and
the integral mass of elastomeric material comprising:
ridges formed into each of the first side surface and the second side surface and
a rib on the top surface extending in a direction away from the bottom surface.

2. The toothbrush of claim 1 wherein at least some of the plurality of elastomeric fingers extend a height from the bottom surface of the bead that is substantially equal to a height at which at least some of the plurality of bristle tufts extend from the bottom surface of the head.

3. The toothbrush of claim 1 wherein at least some of the plurality of elastomeric fingers are substantially orthogonal to the top surface of the head.

4. The toothbrush of claim 1 wherein the plurality of bristle tufts extend from an exposed portion of the plastic.

5. The toothbrush of claim 4 wherein the plurality elastomeric fingers.

6. The toothbrush of claim 1 wherein the plurality of bristle tufts comprise a distal-most bristle tuft, wherein the distal-most bristle tuft is closer to a distal end of the head than all of the plurality of elastomeric fingers.

7. The toothbrush of claim 6 wherein the plurality of bristle tufts comprise a proximal-most bristle tuft, wherein the proximal-most bristle tuft is closer to a proximal end of the head than all of the plurality of elastomeric fingers.

8. The toothbrush of claim 1 wherein the toothbrush has a geometry such that if the toothbrush is in a resting position on a flat surface and the bottom surface of the head is facing the flat surface, the plurality of elastomeric fingers will not contact the flat surface.

9. The toothbrush of claim 1 further comprising:
at least some of the plurality of elastomeric fingers extending a height from the bottom surface of the head that is substantially equal to a height at which at least some of the plurality of bristle tufts extend from the bottom surface of the head;
at least some of the plurality of elastomeric fingers are substantially orthogonal to the top surface of the head;
wherein the plurality of bristle tufts extend from an exposed portion of the plastic;
the plurality of elastomeric fingers comprising a first set of elastomeric fingers and a second set of elastomeric fingers, the plurality of bristle tufts disposed between the first and second sets of elastomeric fingers;
the plurality of bristle tufts comprising a distal-most bristle tuft, wherein the distal-most bristle tuft is closer to a distal end of the head than all of the plurality of elastomeric fingers; and
the plurality of bristle tufts comprising a proximal-most bristle tuft, wherein the proximal-most bristle tuft is closer to a proximal end of the head than all of the plurality of elastomeric fingers.

10. A toothbrush comprising:

a handle;

a head having a proximal end adjacent the handle, a bottom surface, a top surface opposite the bottom surface, and a peripheral surface extending between the bottom surface and the top surface, the peripheral surface comprising a first side surface, a second side surface opposite the first side surface, and a distal side surface extending between the first side surface and the second side surface, the head comprising a plastic and an integral mass of elastomeric material, the integral mass of elastomeric material forming at least a portion of the top surface of the head, at least a portion of the bottom surface of the head, at least a portion of the first side surface of the head, at least a portion of the second side surface of the head, and at least a portion of the distal side surface of the head;

the integral mass of elastomeric material comprising;

a plurality of elastomeric fingers extending from the bottom surface of the head;

a rib on the top surface of the head, the rib extending in a direction away from the bottom surface; and ridges formed into each of the first side surface and the second side surface:

a plurality of bristle tufts extending from the bottom surface of the head;

at least some of the plurality of elastomeric fingers extending a height from the bottom surface of the head that is substantially equal to a height at which at least some of the plurality of bristle tufts extend from the bottom surface of the head;

at least some of the plurality of bristle tufts being slanted in a direction towards the proximal end of the head with respect to a location on the bottom surface of the head from which the at least some of the plurality of bristle tufts extend, wherein the slanted bristle tufts include a first slanted bristle tuft having a first length and a second slanted bristle tuft having a second length, the first length being greater than the second length, and the first slanted bristle tuft being positioned on the head closer to the distal side surface of the head than the second slanted bristle tuft;

at least some of the plurality of elastomeric fingers are substantially orthogonal to the top surface of the head;

each of the plurality of elastomeric fingers terminating in a closed and rounded top end;

the plurality of bristle tufts extending from an exposed portion of the plastic;

the plurality of elastomeric fingers comprising a first set of elastomeric fingers and a second set of elastomeric fingers, the exposed portion of the plastic being disposed between the first and second sets of elastomeric fingers;

the plurality of bristle tufts comprising a. distal-most bristle tuft, wherein the distal-most bristle tuft is closer to a distal end of the head than all of the plurality of elastomeric fingers; and the plurality of bristle tufts comprising a proximal-most bristle tuft, wherein the proximal-most bristle tuft. is closer to a proximal end of the head than all of the plurality of elastomeric fingers.

11. The toothbrush of claim 10 wherein the toothbrush has a geometry such that if the toothbrush is in a resting position on a flat surface and the bottom surface of the head is facing the flat surface, the plurality of elastomeric fingers will not contact the flat surface.

\* \* \* \* \*